US010654513B2

(12) United States Patent
Dite et al.

(10) Patent No.: US 10,654,513 B2
(45) Date of Patent: May 19, 2020

(54) STEERING COLUMN ASSEMBLY

(71) Applicants: TRW Limited, Solihull, West Midlands (GB); TRW Automotive GmbH, Alfdorf (DE)

(72) Inventors: Jan Dite, Herálec (CZ); Niclas Davies, Birmingham (GB); Markus Lingemann, Bochum (DE)

(73) Assignees: TRW Automotive GmbH, Alfdorf (DE); TRW Limited, Solihull, West Midlands (GB)

( * ) Notice: Subject to any disclaimer, the term of this patent is extended or adjusted under 35 U.S.C. 154(b) by 13 days.

(21) Appl. No.: 16/087,132

(22) PCT Filed: Mar. 23, 2017

(86) PCT No.: PCT/GB2017/050831
§ 371 (c)(1),
(2) Date: Sep. 21, 2018

(87) PCT Pub. No.: WO2017/163079
PCT Pub. Date: Sep. 28, 2017

(65) Prior Publication Data

US 2019/0047606 A1 Feb. 14, 2019

(30) Foreign Application Priority Data

Mar. 23, 2016 (GB) .................................. 1604972.8

(51) Int. Cl.
*B62D 1/184* (2006.01)
*B62D 1/19* (2006.01)
*B62D 1/185* (2006.01)

(52) U.S. Cl.
CPC ............ *B62D 1/184* (2013.01); *B62D 1/185* (2013.01); *B62D 1/195* (2013.01)

(58) Field of Classification Search
CPC ......... B62D 1/184; B62D 1/185; B62D 1/195
(Continued)

(56) References Cited

U.S. PATENT DOCUMENTS 4,793,204 A 12/1988 Kubasiak
9,233,707 B2 * 1/2016 Domig .................. B62D 1/192
(Continued)

FOREIGN PATENT DOCUMENTS

DE 102008007094 A1 * 9/2009 ............ B62D 1/195
DE 102008007094 A1 9/2009
(Continued)

OTHER PUBLICATIONS

Translation of DE 102008007094 A1. Accessed at: http://translationportal.epo.org/emtp/translate/?ACTION=description-retrieval&COUNTRY=DE&ENGINE=google&FORMAT=docdb&KIND=A1&LOCALE=en_EP&NUMBER=102008007094&OPS=ops.epo.org/3.2&SRCLANG=de&TRGLANG=en on Jan. 3, 2020. (Year: 2008).*

(Continued)

*Primary Examiner* — Ruth Ilan
*Assistant Examiner* — Hilary L Johns
(74) *Attorney, Agent, or Firm* — MacMillan, Sobanski & Todd, LLC

(57) ABSTRACT

A steering column assembly comprises a telescopic shroud having an outer shroud portion and an inner shroud portion, a clamp rail fixed to an upper face of the inner shroud portion including a slot, a clamp bolt that extends perpendicular to the shroud, a rocker comprising a body from which extends a lever arm, the body having an opening through which the clamp bolt passes, the rocker converting a rotation of the clamp bolt about its axis in a first direction into an upward motion of the lever arm and into a downward motion when the clamp bolt is rotated in the opposing second direction, a (Continued)

106 100 150 120 126 144 136 132 134 104 118 142 116 130 102 108 toothed block having two opposed racks of locking teeth that is connected to a carrier element, the carrier element in turn being connected to the lever of the rocker arm such that movement of the lever arm up and down causes movement of the carrier element up and down between an upper position and a lower position. When the carrier element is in one of the upper position and the lower position, the toothed block is located within the slot such that one of the rows of teeth of the block engages a row of teeth of the slot, and whereby, with the carrier element in the other of the upper position and the lower position, the teeth of toothed block are held clear of the slot, and in which the connection between the clamp bolt and the carrier defines a lost motion mechanism that prevents some of the rotational movement of the clamp bolt from being converted into movement of the toothed block.

20 Claims, 6 Drawing Sheets

(58) Field of Classification Search
USPC ........................................................... 74/493
See application file for complete search history.

(56) References Cited

U.S. PATENT DOCUMENTS

2010/0282016 A1* 11/2010 Oehri .................... B62D 1/184 74/493
2010/0300236 A1* 12/2010 Goulay ................. B62D 1/184 74/493
2013/0118292 A1* 5/2013 Sulser ................... B62D 1/184 74/493

FOREIGN PATENT DOCUMENTS

EP 2923922 A2 9/2015
GB 2451186 A 1/2009
WO 2009047519 A 4/2009

OTHER PUBLICATIONS

Patents Act 1977: Search Report under Section 17(5), Application No. GB 1604972.8 dated Sep. 1, 2016.
PCT International Search Report and the Written Opinion, Application No. PCT/GB2017/050831 filed Mar. 23, 2017, dated Jun. 28, 2017.

* cited by examiner 142
116
144
168
122
140
132

142
116
144
168
122
140
132

STEERING COLUMN ASSEMBLY

CROSS-REFERENCE TO RELATED APPLICATIONS

This application is a national stage of International Application No. PCT/GB2017/050831, filed 23 Mar. 2017, the disclosures of which are incorporated herein by reference in entirety, and which claimed priority to Great Britain Patent Application No. 1604972.8, filed 23 Mar. 2016, the disclosures of which are incorporated herein by reference in entirety.

BACKGROUND TO THE INVENTION

This invention relates to improvements in steering column assemblies and more particularly to a steering column assembly including a lost motion mechanism.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the support bracket to be able to break free of the vehicle body, to allow the steering column assembly to collapse telescopically.

SUMMARY OF THE INVENTION

A feature of the present invention is to provide a steering column assembly that ameliorates some of the limitations present in prior art designs of steering column assembly.

In accordance with a first aspect of the invention there is provided a steering column assembly comprising:

a telescopic shroud having an outer shroud portion and an inner shroud portion, an end of the inner shroud portion extending into the outer shroud portion, a clamp rail fixed to an upper face of the inner shroud portion including a slot that extends axially along the inner shroud portion, the slot defining two opposing walls which each carry a rack of locking teeth, a clamp bolt that extends perpendicular to the shroud that may be rotated around its long axis by operation of a locking lever, a rocker comprising a body from which extends a lever arm, the body having an opening through which the clamp bolt passes, the rocker converting a rotation of the clamp bolt about its axis in a first direction into an upward motion of the lever arm and into a downward motion when the clamp bolt is rotated in the opposing second direction, a toothed block having two opposed racks of locking teeth that is connected to a carrier element, the carrier element in turn being connected to the lever of the rocker arm such that movement of the lever arm up and down causes movement of the carrier element up and down between an upper position and a lower position, whereby, with the carrier element in one of the upper position and the lower position, the toothed block is located within the slot such that one of the rows of teeth of the block engages a row of teeth of the slot, and whereby, with the carrier element in the other of the upper position and lower position, the teeth of toothed block are held clear of the slot, and in which the connection between the clamp bolt and the carrier element defines a lost motion mechanism that prevents some of the rotational movement of the clamp bolt from being converted into movement of the toothed block, The lost motion mechanism may permit an angular movement of the clamp bolt of at least 20 degrees, or at least 30 degrees, and preferably between 30 and 40 degrees, whilst achieving a linear movement of the toothed block of less than 20 mm.

The lost motion mechanism may provide for rotational lost motion, or rotational reduction, between the clamp bolt and the rocker, or some linear lost motion between the rocker and the carrier element, or between both the clamp bolt/rocker and the rocker/carrier element.

There may be no lost motion during the rest of the movement of the clamp bolt, especially during the final stages of clamping as the toothed block is pressed into the slot, to provide a reassuring clamping feel and increase in clamp force, The lost motion connection may be arranged to “lose” up to 5 degrees, or up to 10 degrees, or preferably up to 20 degrees, of angular movement of the clamp bolt at the first/last/intermediate stage of clamping/unclamping, i.e. as the toothed block is raised. The toothed block may stop moving during this rotational reduction of the clamp bolt.

The lost motion provided by the lost motion mechanism may be achieved by the provision of some free play between the opening in the rocker and the shape of a corresponding portion of the clamp bolt such that the free play has to be taken up by an amount of rotation of the clamp bolt before it acts upon the rocker. The opening and clamp bolt may therefore include some intentional free play at the end of the unclamping movement that achieves the rotational reduction.

In particular the portion of the clamp bolt that is located with the rocker may comprise a non-circular cross, the opening in the rocker also being non-circular in cross section.

The lever arm of the rocker may be connected to the carrier element through a further lost motion mechanism.

The carrier element may comprise a rigid block that has an opening in which the end of the rocker arm is located, the rigid block preferably being connected to the toothed block by a connecting pin.

The opening in the carrier element may be oversized to provide some lost motion.

In particular a spring may be provided that acts between the lever arm and the carrier element or the toothed body, the spring being compressed by the rocker arm as the toothed block engages the teeth of the slot to provide some lost motion.

The lever arm may be located within an opening that is bounded on one side by the spring and on the other side by a portion of the carrier element, the width of the opening being greater than the width of the rocker arm within the opening so as to provide some additional lost motion in addition to the lost motion provided by compression of the spring.

The spring may be arranged to become compressed as the lever arm of the rocker approaches its lowest position such that the spring applies a compressive force between the toothed block and the lever arm when clamped.

The spring may comprise a leaf spring. This may comprise a bent metal or composite strip that is secured to the carrier element.

The carrier element may be free to move from side to side to permit the toothed block to move from side to side within the slot.

The connecting pin may be frangible such that a crash load as would be expected during a crash will cause the pin to break permitting the block to move freely relative to the carrier element.

Other advantages of this invention will become apparent to those skilled in the art from the following detailed description of the preferred embodiments, when read in light of the accompanying drawings.

BRIEF DESCRIPTION OF THE DRAWINGS

FIGS. 5*a* to 3*d* show a simplified view of the components of FIG. 4 during an unclamping and clamping motion.

DETAILED DESCRIPTION OF THE INVENTION

Figure 1:
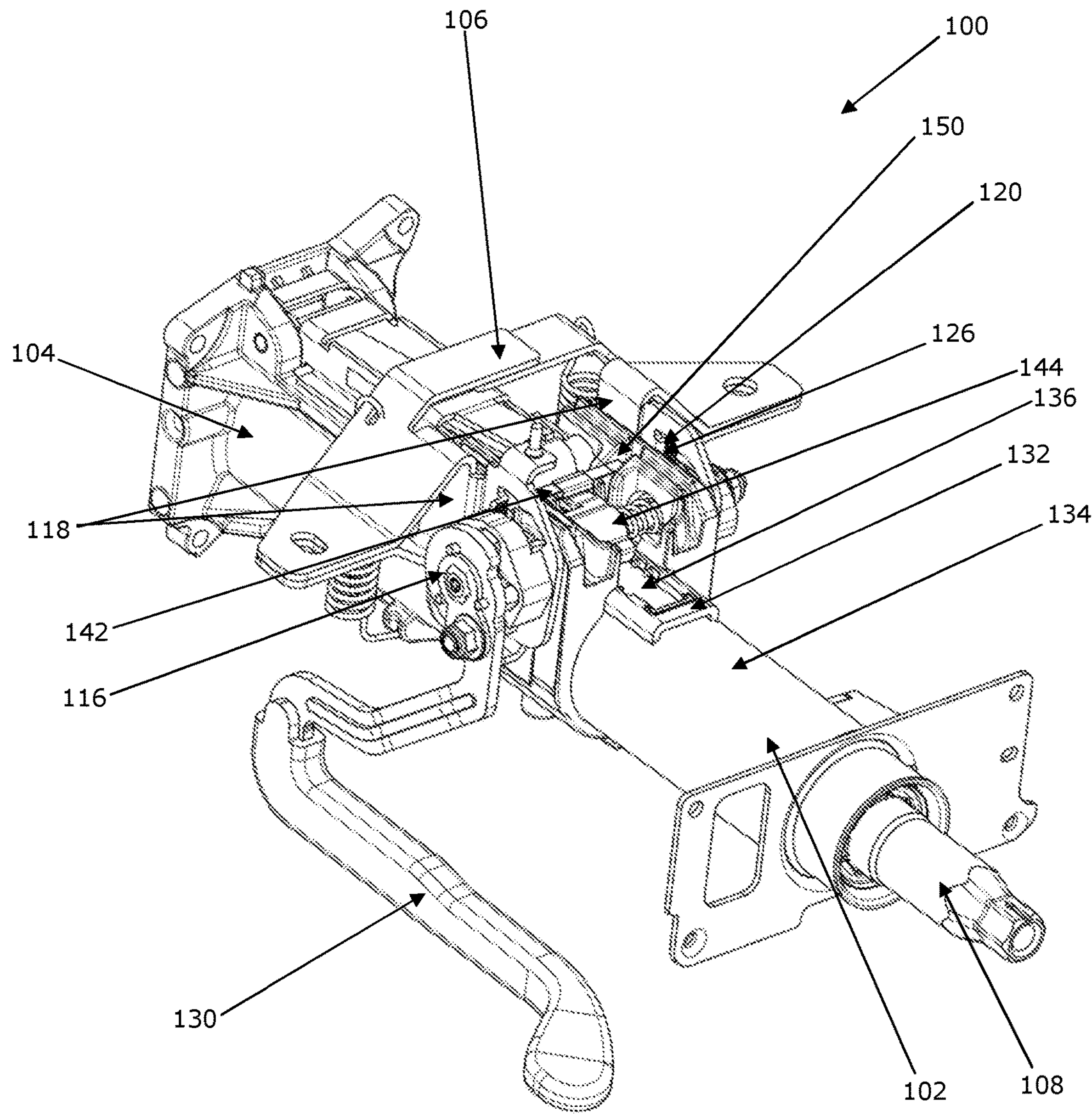
FIG. 1 depicts an isometric view of a steering column assembly in accordance with the first aspect of the invention.
Figure 2:
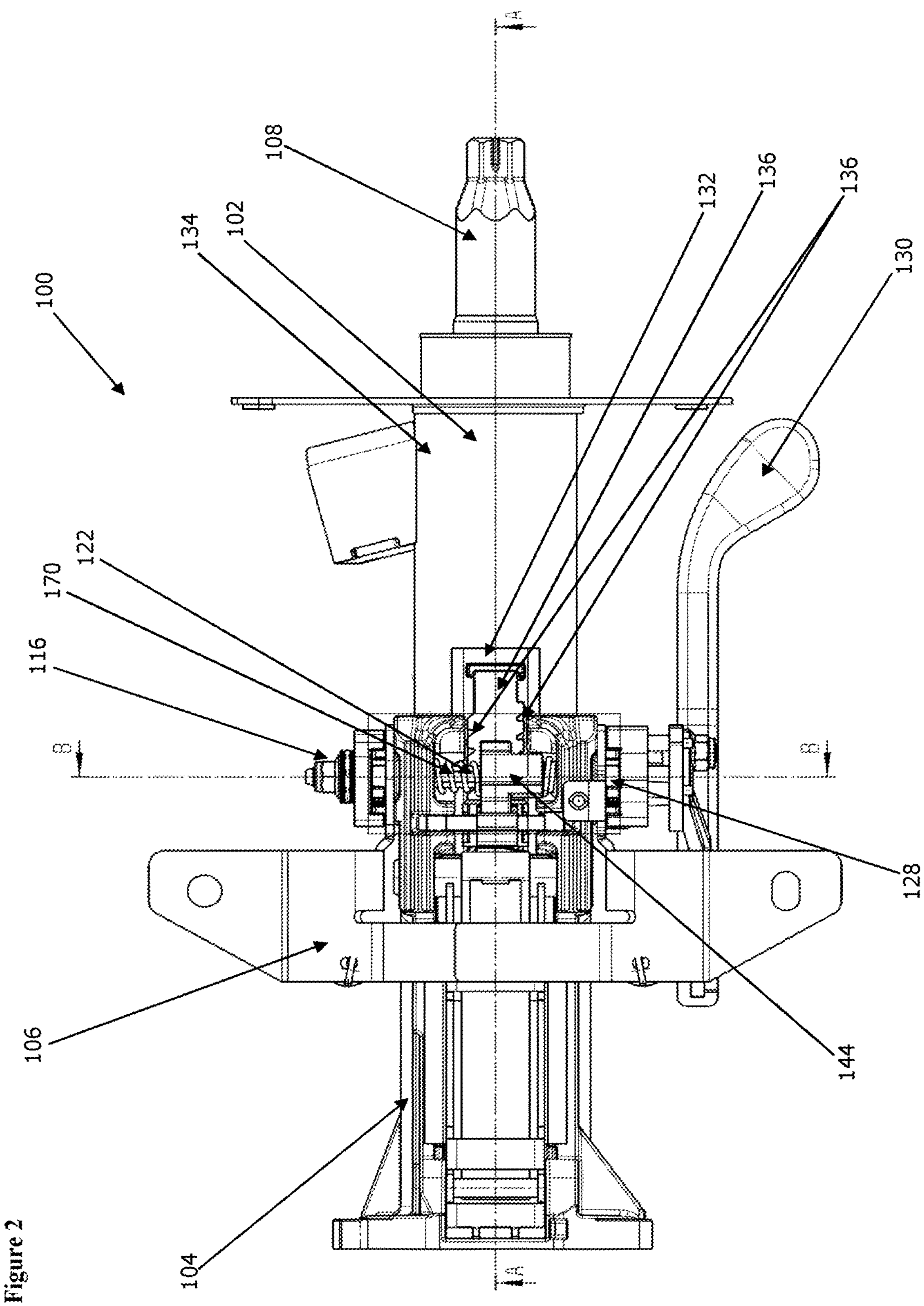
FIG. 2 shows a plan view of the steering column assembly of FIG. 1.
Figure 3:
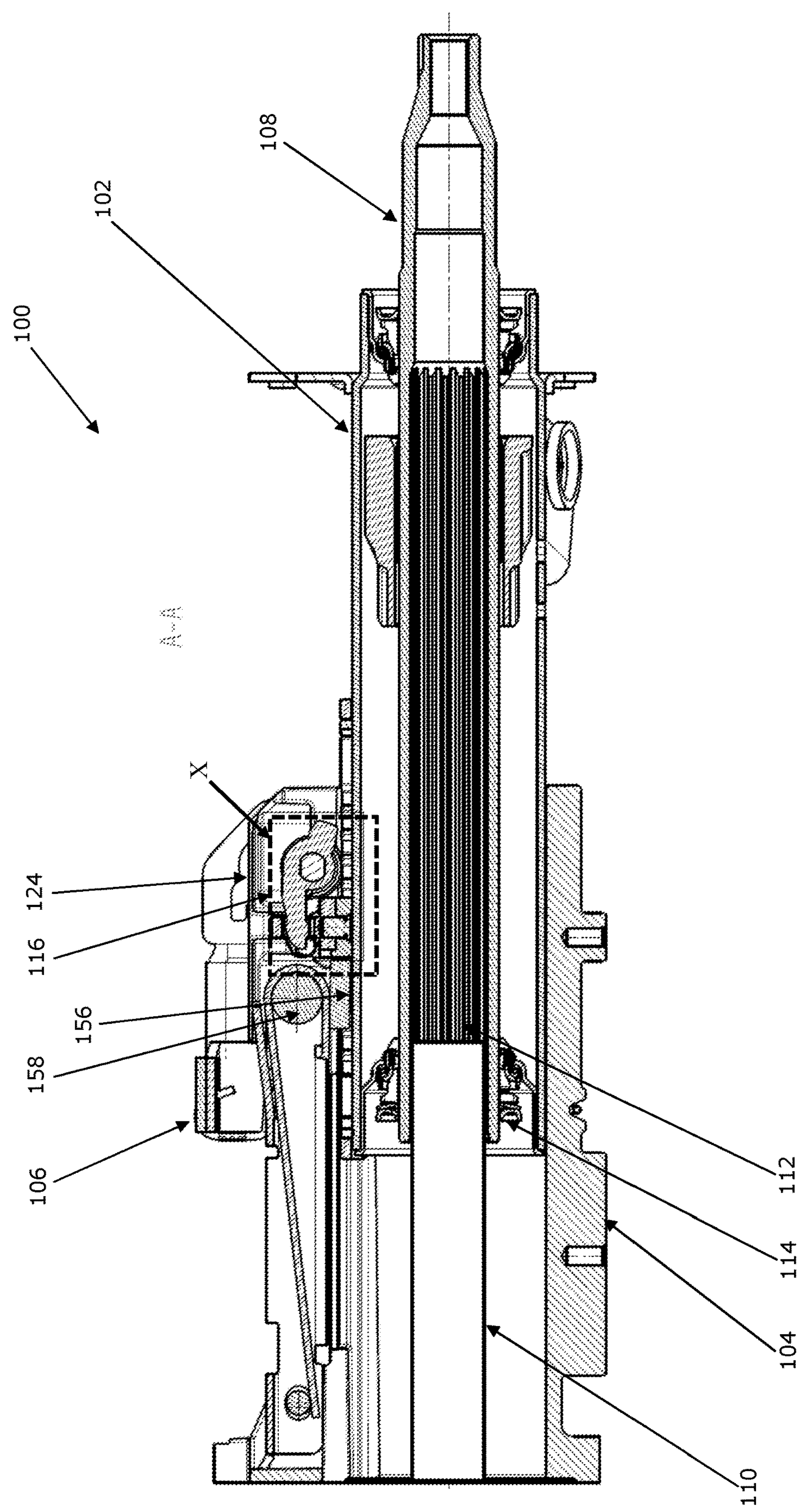
FIG. 3 is a cross-sectional representation of the steering column assembly of FIG. 2 along the line A-A.

Referring first to FIGS. 1 to 3, a steering column assembly 100 is shown, in accordance with the first aspect of the invention. The steering column assembly 100 comprise a shroud 102, 104 having and inner shroud portion 102 and an outer shroud portion 104, each of which comprises a substantially cylindrical tube. The shroud 102, 104 extends from a gearbox housing (not shown) that is fixed at a pivot point to a part of the vehicle body and also releasably fixed to a support bracket 106 which is secured to the vehicle, typically by welding or bolting it to a region under the dashboard at a point somewhere between the pivot and the steering wheel.

The shroud portions 102, 104 are moveable relative to each other with the end of the inner shroud portion 102 being a sliding fit within an end of the outer shroud portion 104. The shroud 102, 104 surrounds a telescopic steering column shaft 108, 110. The shaft 108, 110 includes an upper shaft portion 108 that at least partially surrounds a lower shaft portion 110, the two portions being connected through complimentary axially extending splines 112. The opposite end of the upper shaft portion 108 is tapered so that it can be secured to a steering wheel (not shown). The lower shaft portion 110 is connected to the gearbox housing (not shown), which in turn connects to the road wheels of the vehicle. The skilled person will understand that the invention also applied to so-called “inverted tube M tube” assemblies in which the moving part will slide over the fixed part rather than within it.

As depicted, the upper shaft portion 108 fits over the lower shaft portion 110 and can move axially whilst the lower shaft portion 110 is fixed in an axial direction. Similarly, the inner shroud portion 102 is located towards the steering wheel and slides within the outer shroud portion 104, which is also fixed in an axial direction. An upper column bearing assembly 114 is located between the upper shaft portion and the outer shroud portion. This snugly fills the space and ensures that the shaft 108, 110 is located securely within the shroud 102, 104.

The shroud 102, 104 is fixed to the bracket 106 by a clamp mechanism 116. The clamp mechanism 116 can be unlocked and locked to allow the rake of the steering column shroud 102, 104 to be adjusted by pivoting about the pivot point. When locked the steering column shroud 102, 104 cannot easily be moved.

The bracket 106 includes two arms 118 which extend generally downwards in a vertical plane and extend down either side of the shroud 102, 104. The bracket 106 is securable to the vehicle body using bolts (not shown) that pass through openings 120 in the bracket 116.

The clamp mechanism 116 comprises a clamp bolt 122 or pin which passes through a respective generally vertical slot 124 in each arm 118. The shape of the vertical slots 124 determines the available rake adjustment of the steering column shroud 102, 104. The slots 124 include a vertical rack 126 with a plurality of teeth. Respective cams 128 mounted on the clamp bolt 122 releasably engage with the teeth of the vertical rack 126 upon rotation of the clamp bolt 122. A lever 130 mounted adjacent to one end of the clamp bolt 122 enables this rotation. Thus, the rake of the steering column assembly 100 can be adjusted.

In order to adjust for reach, a clamp rail or horizontal rack 132 is provided which in the depicted embodiment is affixed to an outer surface 134 of the inner shroud portion 102. The horizontal rack 132 includes a slot 136 with two opposing and parallel rows of teeth 138, extending in an axial direction along the inner shroud portion 102.

Releasably engageable with the horizontal rack 132 is a toothed block 140. The toothed block 140 includes teeth on each of its sides which are complementarily-shaped so as to allow engagement with the teeth of the horizontal rack 132. The toothed block 140 itself is held in a fixed position relative to the support bracket 106 by a carrier element 142. Thus, with the toothed block 140 in an engaged condition, the teeth provide positive locking of the toothed block 140, and thus the support bracket 106, relative to the horizontal rack 132 which prevents the inner shroud portion 102 moving in an axial direction.

The releasable engagement of the toothed block 140 is controlled by a rocker 144 which is attached to the clamp bolt 122 and positioned, in use, between the two arms 118 of the support bracket 106. The rocker 144 is shown in detail in FIG. 4.

The rocker 144 includes a main body 146 which is located about the clamp bolt 122 and a lever arm 148 which extends towards and is received within an opening 149 in the carrier element 142. The carrier element 142 is held in the support bracket 106 within guides 150 which allow movement only in a radial direction relative to the shroud 102, 104. As such, upon rotation of the rocker 144 in a first direction, the lever arm 148 presses against an upper portion 152 of the carrier element 142, causing the movement of the carrier element 142 away from the horizontal rack 132 and drawing the toothed block 140 out of engagement. Upon rotation of the rocker 144 in a second direction opposite to the first direction, the carrier element 142 is lowered and the toothed block 140 is engaged with the horizontal rack 132.

The toothed block 140 is separable from the carrier element 142 in the event of a large force being exerted on the toothed block 140, for example in the event of a crash in which the driver of the vehicle impacts the steering wheel. The toothed block 140 is connected to the carrier element 142 by way of a frangible pin 154. The frangible pin 154 is configured to break upon the application of a predetermined force, which can thus be configured to be the force likely to be endured in a crash situation. The breaking of the frangible pin 154 allows the inner shroud portion 102, with horizontal rack 132 and toothed block 140 attached, to collapse, whilst the clamp mechanism 116 and carrier element 142 stay in position relative to the support bracket 106.

During collapse, the toothed block 140 will impact upon, and move a puller 156. The puller 156 comprises a strip of material, usually metal, which is deformed around an anvil 158 upon movement of the toothed block 140. As such, the collapse of the steering column assembly 100 is controlled.

The clamp mechanism 116, including the rocker 144 and carrier element 142, also comprises a lost motion mechanism 160. The lost motion mechanism 160 is configured such that the lever 130 of the clamp mechanism 116 can move through an angle which is comparatively larger than that to engage and disengage the toothed block 140. This results in an enhanced user experience.

A first part of the lost motion mechanism 160 is allowed by the relative shapes of the rocker 144 and clamp bolt at the point at which they engage. The relative shapes allow the clamp bolt 122 to freely within the rocker 144 before engaging and causing movement of the rocker 144. This allows the lever 130 to move through a predetermined angle allowed by the relative shapes of the rocker 144 and clamp bolt 122 before moving the rocker 144. This first part of the lost motion mechanism 160 therefore causes rotational reduction between the clamp bolt 122 and rocker 144.

In the depicted embodiment, the clamp bolt 122 is formed as a cylinder flattened so as to produce two additional opposing faces 162. Similarly, a bore 164 of the rocker 144 through which the clamp bolt 122 passes is substantially cylindrical but with two opposing inwardly-curved faces 166. Spaces are formed between the opposing faces 162 of the clamp bolt 122 and the inwardly-curved faces 166 of the rocker 144 which allows the lost motion before engagement. Due to the curvature of the inwardly-curved faces 166 of the rocker 144, the area of engagement is relatively large such that the force of the lever 130 motion is spread over the rocker 144. However, it is also possible to provide planar faces, although this may result in high levels of stress within the rocker 144.

Alternative methods of allowing motion between the clamp bolt 122 and the rocker 144 before engagement may also be used. For example, loose fitting pins between the two parts could allow free play or any other form of inter-engagement may be adapted to achieve this feature.

A further part of the lost motion mechanism 160 is formed by the engagement of the lever arm 148 of the rocker 144 with the carrier element 142. The opening 149 in the carrier element 142 is larger than the lever arm 148 such that the lever arm 148 may move within the carrier element 142 before contacting the carrier element 142. Additionally, as the opening 149 is wider than the lever arm 148, the carrier element 142 may move laterally during engagement of the toothed block 140 with the horizontal rack 132, aiding engagement.

As an additional feature, a leaf spring 168 is positioned at least partially between the lever arm 148 and the carrier element 142. In the depicted embodiment the leaf spring 168 acts to provide a biasing force to the carrier element 142, when the clamp mechanism 116 is in the clamped position. Advantageously, the leaf spring 168 also reduces rattle of the carrier element 142, ensuring that the assembly feels of a high quality to a user. The leaf spring 168 is fixed onto the upper portion 152 of the carrier element 142 and extends over an end of the lever arm 148. When the lever arm 148 moves clockwise, the leaf spring 168 does not absorb any of the motion and the lever arm 148 forces the carrier element 142 to move upwards in the guides 150. However, when the lever arm 148 moves anticlockwise, the spring 168 does resist the motion once the toothed block 140 is engaged, causing the biasing force to be applied to the toothed block 140 and providing increased force feedback to the user, such that they are aware that the toothed block 140 is engaged with the horizontal rack 132. In order to assist with the depression of the leaf spring 168, the lever arm 148 includes a protrusion which engages with the leaf spring 168 throughout the motion. Alternatively, the protrusion may be found on the leaf spring 168 itself.

A coil spring 170 is provided which locates the rocker 144 in the centre of the clamp bolt 122. The coil spring 170 resists any substantial lateral movement of the rocker 144 along the clamp bolt 122 whilst preventing or limit the transmission of vibrations between the support bracket 106, clamp bolt 122, and rocker 144, lowering the chances of unwanted rattle.

Figure 4:
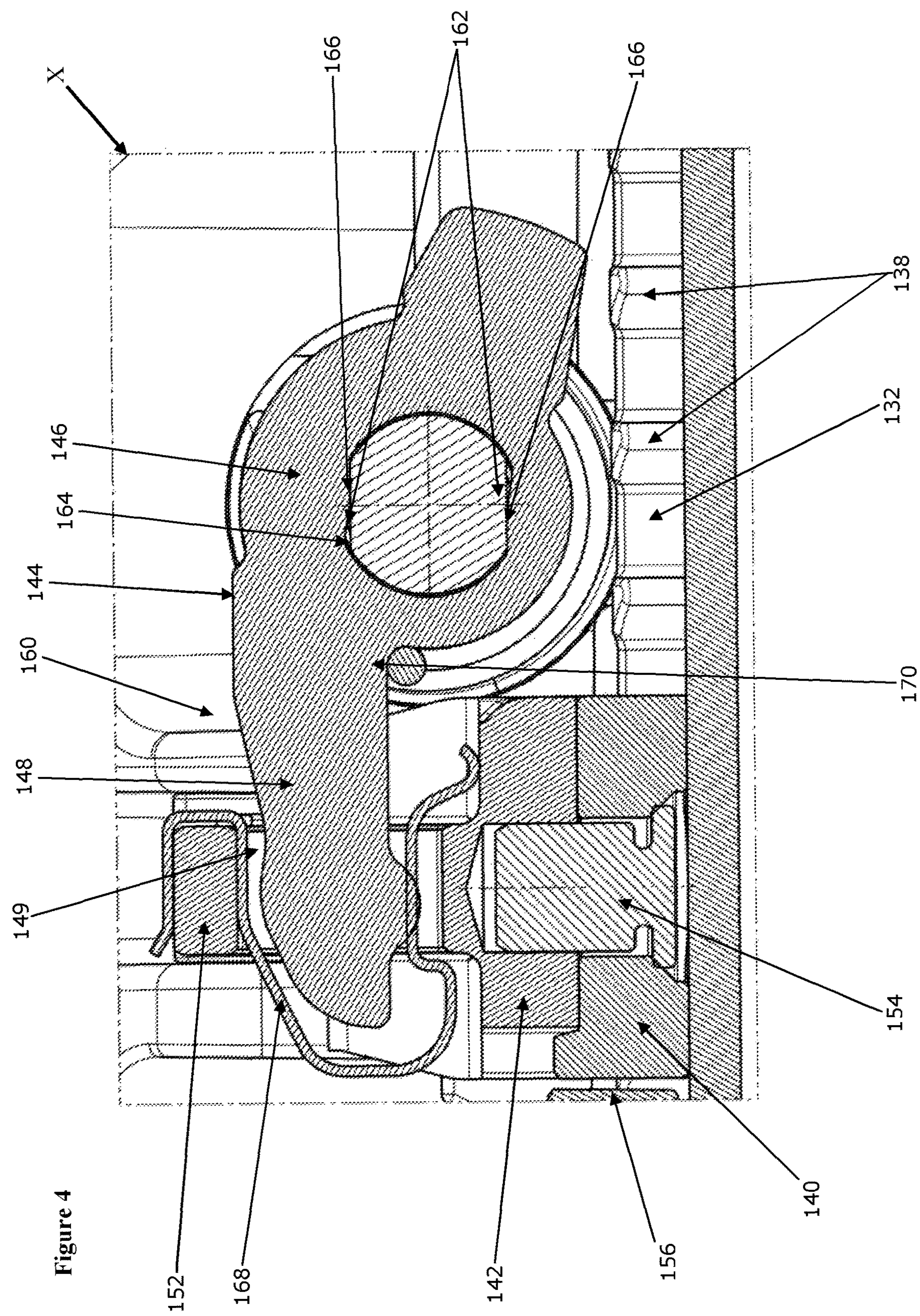
FIG. 4 is an enlarged view of the rocker, toothed block, and slot of FIG. 3.

FIGS. 5*a* to 5*d* show a simplified version of the clamp mechanism 116 of FIG. 4 showing the sequential movements of the clamping mechanism 116 when unclamping and clamping. The simplified version also exaggerates the shape difference between the clamp bolt 122 and rocker 144 of the present embodiment, although there is no reason why the lost motion mechanism should not allow such large amount of movement, if desired.

The simplified depiction includes the horizontal rack 132, rocker 144, clamp bolt 122, carrier element 142, toothed block 140, and spring 168. The carrier element 142 and toothed block 140 are combined as one element, for the purposes of simplification.

Figure 5A:
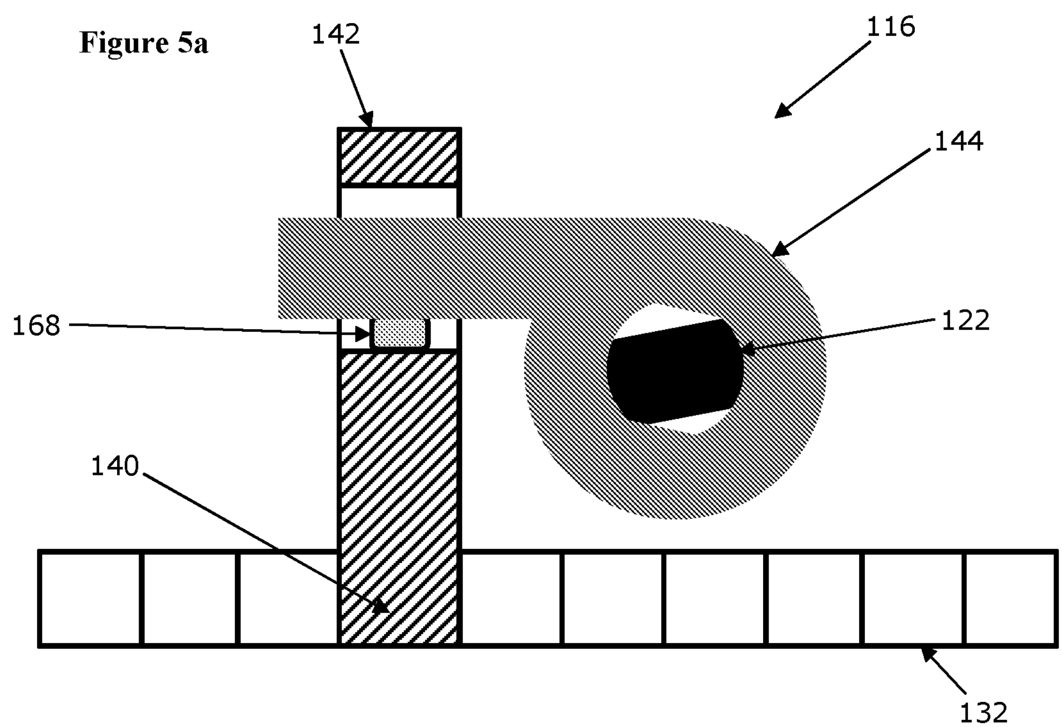

When the clamp mechanism 116 is in the clamped position, the components are in the position as shown in FIG. 5*a*. The spring 168 provides the biasing force to prevent the toothed block 140 disengaging from the horizontal rack 132 and the clamp bolt 122 is rotated fully in the clockwise direction (as depicted). Upon initiating the unclamping process, the lever 130 being moved causes the clamp bolt 122 to rotate clockwise within the rocker 144. Due to the lost motion mechanism 160, the clamp bolt 122 is enabled to rotate without causing motion of the rocker 144 itself, i.e. motion is 'lost'.

Figure 5B:
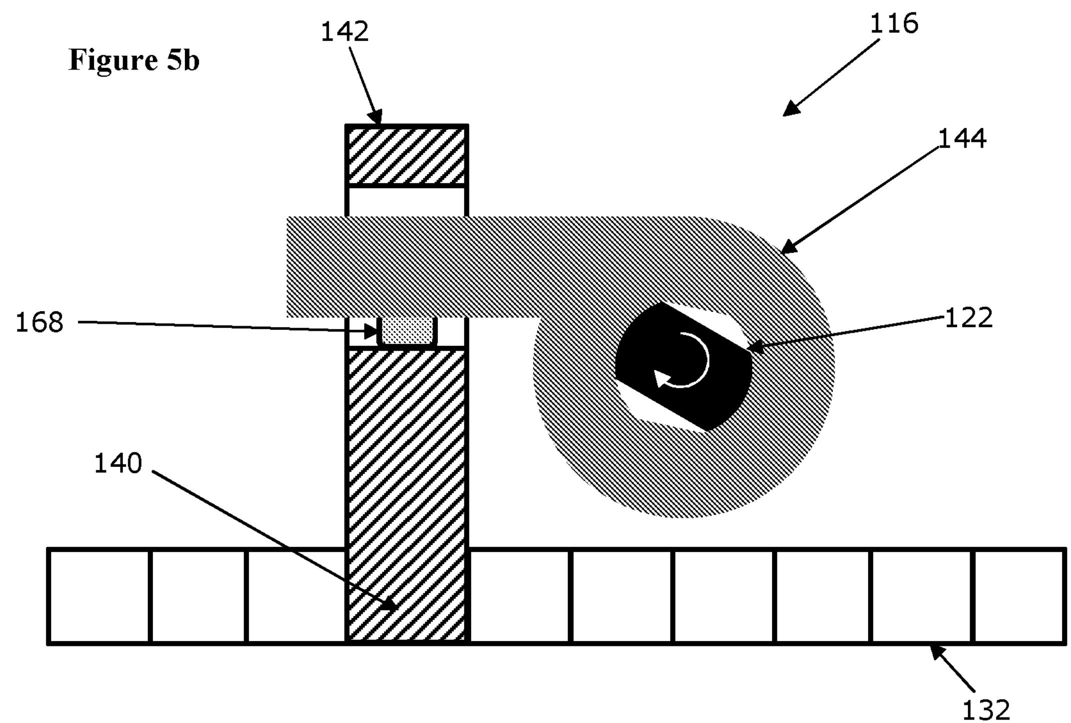
Figure 5C:
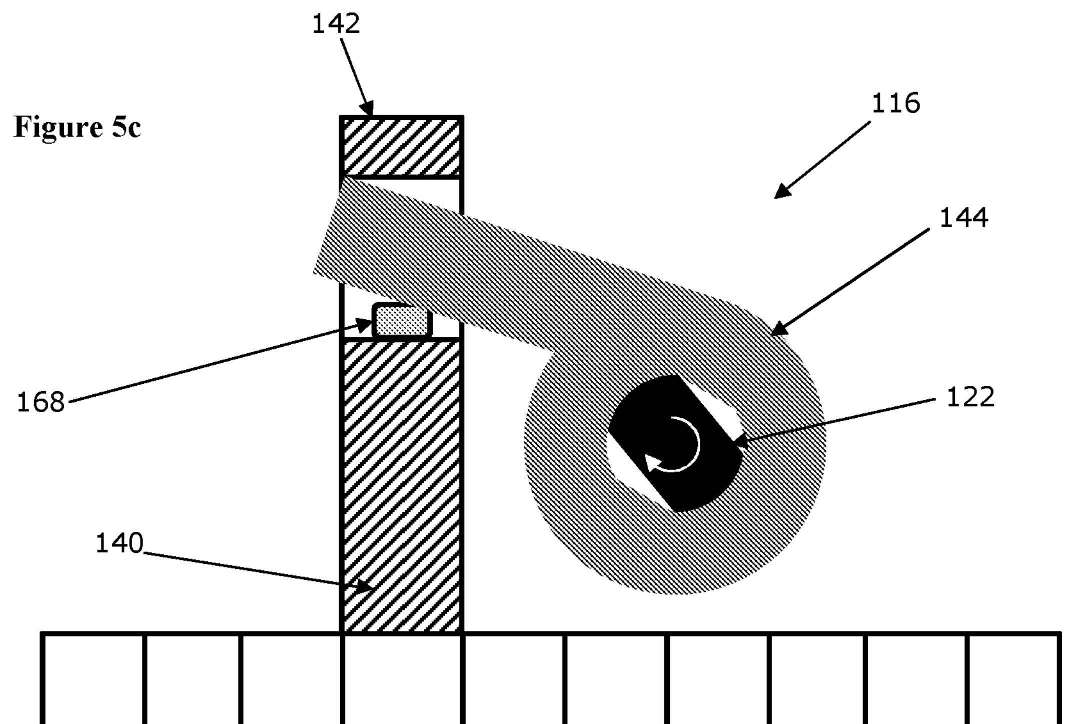

At the position depicted in FIG. 5*b*, the clamp bolt 122 engages with the rocker 144 and thus the rocker 144 begins to move with the clamp bolt 122. The lever arm 148 of the rocker 144 then contacts the upper portion 152 of the carrier element 142, causing the carrier element 142 to rise in the guides 150 and out of engagement with the horizontal rack 132, as shown in FIG. 5*c*. The lever 130 will then reach the end of its travel, preventing any further motion which may cause the lever arm 148 to dislocate from the opening 149 of the carrier element 142.

Figure 5D:
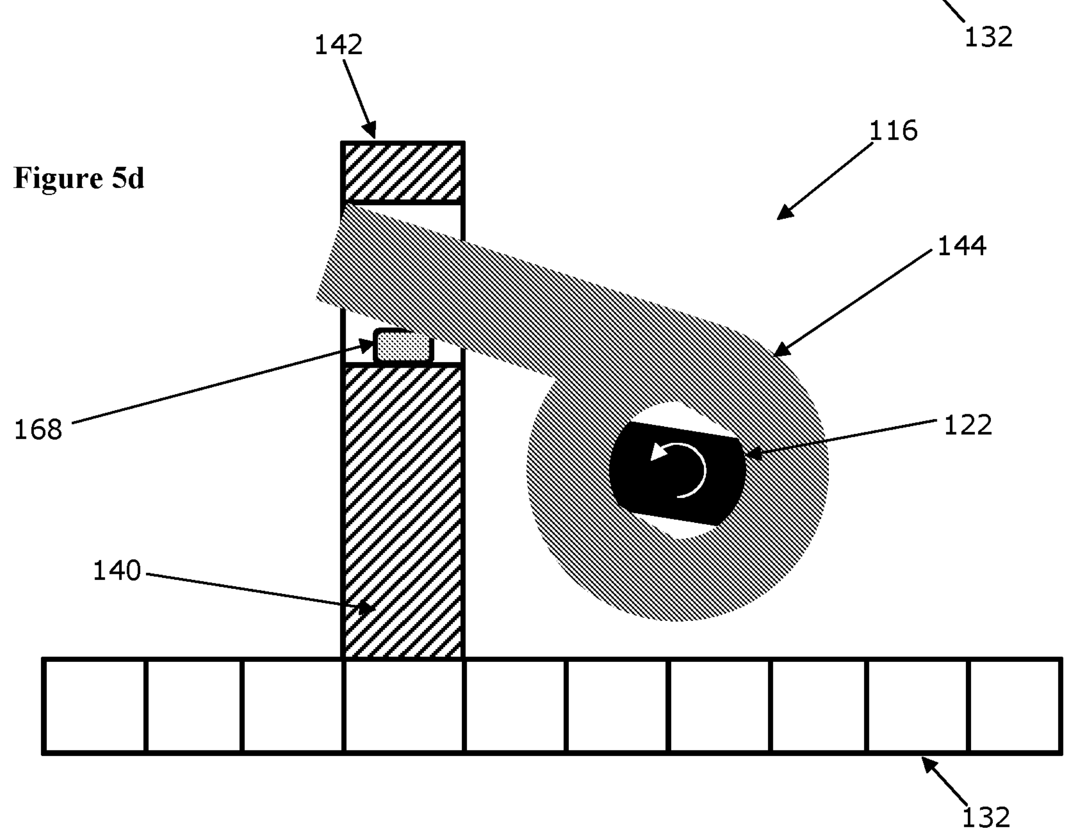

Rotation of the clamp bolt 122 in the anticlockwise direction will then result in the clamp bolt 122 rotating within the rocker 144 without causing rotation of the rocker 144, as shown in FIG. 5*d*. Thus, motion will be 'lost' again. Upon reaching the position shown, the clamp bolt 122 will then engage with the rocker 144 and the toothed block 140 will be re-engaged with the horizontal rack 132, as in FIG. 5*a*, with the spring 168 providing the biasing force once again. The movement may then be repeated as necessary. It is therefore clear to see how the motion is 'lost' in both directions by both the relative motion of the clamp bolt 122 and rocker 144, and the relative motion of the lever arm 148 and carrier element 142. This lost motion may be provided by the interactions between only the clamp bolt 122 and rocker 144 or the rocker 144 and carrier element 142, if desired.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:

a telescopic shroud having an outer shroud portion and an inner shroud portion, an end of the inner shroud portion extending into the outer shroud portion, a clamp rail fixed to an upper face of the inner shroud portion including a slot that extends axially along the inner shroud portion, the slot defining two opposing walls which each carry a rack of locking teeth, a clamp bolt that extends perpendicular to the telescopic shroud that is configured to be rotated around a long axis thereof by operation of a locking lever, a rocker comprising a body from which extends a lever arm, the body having an opening through which the clamp bolt passes, the rocker converting a rotation of the clamp bolt about the long axis in a first direction into an upward motion of the lever arm and into a downward motion when the clamp bolt is rotated in an opposing second direction, a toothed block having two opposed racks of locking teeth that is connected to a carrier element, the carrier element in turn being connected to the lever arm of the rocker such that movement of the lever arm up and down causes movement of the carrier element up and down between an upper position and a lower position, whereby, with the carrier element in one of the upper position and the lower position, the toothed block is located within the slot such that one of the two opposed racks of locking teeth of the toothed block engages the locking teeth of the slot, and whereby, with the carrier element is the other of the upper position and the lower position, the two opposed racks of locking teeth of toothed block are held clear of the slot, and in which the connection between the clamp bolt and the carrier element defines a lost motion mechanism that prevents some of the rotational movement of the clamp bolt from being converted into movement of the toothed block.

2. The steering column assembly as claimed in claim 1, wherein the lost motion mechanism permits an angular movement of the clamp bolt of at least 20 degrees, whilst achieving a linear movement of the toothed block between raised and lowered conditions of less than 20 mm.

3. The steering column assembly as claimed in claim 1, wherein the lost motion mechanism provides for rotational lost motion between the clamp bolt and the rocker.

4. The steering column assembly as claimed in claim 1, wherein the lost motion mechanism is arranged to lose up to 5 degrees, of angular movement of the clamp bolt at a first/last/intermediate stage of a clamping/unclamping thereof.

5. The steering column assembly as claimed in claim 1, wherein the lost motion mechanism provides for linear lost motion between the rocker and the carrier element.

6. The steering column assembly as claimed in claim 1, wherein the lost motion mechanism is provided by free play between the opening in the rocker and a shape of a corresponding portion of the clamp bolt, such that the free play has to be taken up by an amount of rotation of the clamp bolt before the clamp bolt acts upon the rocker.

7. The steering column assembly as claimed in claim 6, wherein the corresponding portion of the clamp bolt comprises a non-circular cross section, the opening of the rocker also being non-circular in cross-section.

8. The steering column assembly as claimed in claim 1, wherein the lever arm of the rocker is connected to the carrier element through a further lost motion mechanism.

9. The steering column assembly as claimed in claim 1, wherein the carrier element comprises a rigid block including an opening in which the lever arm is located.

10. The steering column assembly as claimed in claim 8, wherein the opening in the carrier element is oversized to provide some lost motion.

11. The steering column assembly as claimed in claim 9, further comprising a spring which acts between the lever arm and the carrier element or the lever arm and the toothed body, the spring being compressed by the rocker arm as the toothed block engages the locking teeth of the slot, to provide some lost motion.

12. The steering column assembly as claimed in claim 10, wherein the lever arm is bounded on one side by the spring and on the other side by a portion of the carrier element, a width of the opening being greater than a width of the rocker arm within the opening so as to provide some additional lost motion in addition to the lost motion provided by compression of the spring.

13. The steering column assembly as claimed in claim 11, wherein the spring is arranged to be compressed as the lever arm of the rocker approached a lowest position thereof such that the spring applies a compressive force between the toothed block and a lever arm, when clamped.

14. The steering column assembly as claimed in claim 11, wherein the spring is a leaf spring.

15. The steering column assembly as claimed in claim 14, wherein the leaf spring is a bent metal or composite strap that is secured to the carrier element.

16. The steering column assembly as claimed in claim 1, wherein the carrier element is free to move from side to side to permit the toothed block to move from side to side within the slot.

17. The steering column assembly as claimed in claim 1, wherein the carrier element is connected to the toothed block by a connecting pin.

18. The steering column assembly as claimed in claim 17, wherein the connecting pin is frangible such that a crash load as expected during a crash will cause the connecting pin to break, permitting the block to move freely relative to the carrier element.

19. The steering column assembly as claimed in claim 1, wherein the lost motion mechanism is arranged to lose up to 10 degrees, of angular movement of the clamp bolt at a first/last/intermediate stage of a clamping/unclamping thereof.

20. The steering column assembly as claimed in claim 1, wherein the lost motion mechanism is arranged to lose up to 20 degrees, of angular movement of the clamp bolt at a first/last/intermediate stage of a clamping/unclamping thereof.

* * * * *